(12) United States Patent
Maier

(10) Patent No.: US 8,434,998 B2
(45) Date of Patent: May 7, 2013

(54) ROTARY SEPARATOR DRUM SEAL

(75) Inventor: William C. Maier, Almond, NY (US)

(73) Assignee: Dresser-Rand Company, Olean, NY (US)

( * ) Notice: Subject to any disclaimer, the term of this patent is extended or adjusted under 35 U.S.C. 154(b) by 900 days.

(21) Appl. No.: 12/441,790

(22) PCT Filed: Sep. 17, 2007

(86) PCT No.: PCT/US2007/020101
§ 371 (c)(1),
(2), (4) Date: Jul. 28, 2009

(87) PCT Pub. No.: WO2008/036221
PCT Pub. Date: Mar. 27, 2008

(65) Prior Publication Data
US 2009/0304496 A1    Dec. 10, 2009

Related U.S. Application Data

(60) Provisional application No. 60/845,614, filed on Sep. 19, 2006.

(51) Int. Cl.
*F03B 11/08* (2006.01)
*F04D 29/70* (2006.01)
*F01D 5/00* (2006.01)

(52) U.S. Cl.
USPC ................................ 415/121.2; 415/171.1

(58) Field of Classification Search ............... 415/121.2, 415/170.1, 171.1–171.3, 171.5, 56.1, 174.1–174.3, 415/174.5
See application file for complete search history.

(56) References Cited

U.S. PATENT DOCUMENTS

| 815,812 A | 3/1906 | Cow |
| 1,057,613 A | 4/1913 | Baldwin |

(Continued)

FOREIGN PATENT DOCUMENTS

| CA | 2647511 | 10/2007 |
| EP | 301285 | 10/1991 |

(Continued)

OTHER PUBLICATIONS

PCT/US2007/008149 International Preliminary Report on Patentability dated Sep. 30, 2008.

(Continued)

*Primary Examiner* — Nathaniel Wiehe
*Assistant Examiner* — Su Htay
(74) *Attorney, Agent, or Firm* — Edmonds & Nolte, PC

(57) ABSTRACT

A seal assembly for a compressor includes a static member fixedly disposed within a compressor casing and having an end surface and a rotatable separator coupled with a compressor shaft and spaced from the static member. The separator has an axial end with a radial end surface located adjacent to the static member end surface such that a clearance space is defined therebetween. The separator has a plurality of openings extending inwardly from the end surface and spaced about the shaft axis such that land surface sections are defined on the end surface. The land surface sections or/and the openings are configured to prevent fluid flow radially inwardly through the clearance space. The static member has two annular walls receiving an end portion of the separator, with annular ridges providing labyrinth seals disposed against inner and outer surfaces of the separator, and an annular deflector with an angled deflector surface.

13 Claims, 7 Drawing Sheets

U.S. PATENT DOCUMENTS

| | | | |
|---|---|---|---|
| 1,061,656 A | 5/1913 | Black | |
| 1,480,775 A | 1/1924 | Marien | |
| 1,622,768 A | 3/1927 | Cook et al. | |
| 1,642,454 A | 9/1927 | Malmstrom | |
| 2,006,244 A | 6/1935 | Kopsa | |
| 2,300,766 A | 11/1942 | Baumann | |
| 2,328,031 A | 8/1943 | Risley | |
| 2,345,437 A | 3/1944 | Tinker | |
| 2,602,462 A | 7/1952 | Barrett | |
| 2,811,303 A | 10/1957 | Ault et al. | |
| 2,836,117 A | 5/1958 | Lankford | |
| 2,868,565 A | 1/1959 | Suderow | |
| 2,897,917 A | 8/1959 | Hunter | |
| 2,932,360 A | 4/1960 | Hungate | |
| 2,954,841 A | 10/1960 | Reistle | |
| 3,044,657 A | 7/1962 | Horton | |
| 3,191,364 A | 6/1965 | Sylvan | |
| 3,198,214 A | 8/1965 | Lorenz | |
| 3,204,696 A | 9/1965 | De Priester et al. | |
| 3,213,794 A | 10/1965 | Adams | |
| 3,220,245 A | 11/1965 | Van Winkle | |
| 3,273,325 A | 9/1966 | Gerhold | |
| 3,352,577 A | 11/1967 | Medney | |
| 3,395,511 A | 8/1968 | Akerman | |
| 3,431,747 A | 3/1969 | Hasheimi et al. | |
| 3,454,163 A | 7/1969 | Read | |
| 3,487,432 A | 12/1969 | Jenson | |
| 3,490,209 A | 1/1970 | Fernandes et al. | |
| 3,500,614 A | 3/1970 | Soo | |
| 3,578,342 A | 5/1971 | Welch | |
| 3,628,812 A | 12/1971 | Larraide et al. | |
| 3,672,733 A | 6/1972 | Arsenius et al. | |
| 3,814,486 A | 6/1974 | Schurger | |
| 3,829,179 A | 8/1974 | Kurita et al. | |
| 3,915,673 A | 10/1975 | Tamai et al. | |
| 3,975,123 A | 8/1976 | Schibbye | |
| 4,033,647 A | 7/1977 | Beavers | |
| 4,059,364 A | 11/1977 | Anderson et al. | |
| 4,078,809 A | 3/1978 | Garrick et al. | |
| 4,087,261 A | 5/1978 | Hays | |
| 4,103,899 A | 8/1978 | Turner | |
| 4,112,687 A | 9/1978 | Dixon | |
| 4,117,359 A | 9/1978 | Wehde | |
| 4,135,542 A | 1/1979 | Chisholm | |
| 4,141,283 A | 2/1979 | Swanson et al. | |
| 4,146,261 A | 3/1979 | Edmaier et al. | |
| 4,165,622 A | 8/1979 | Brown, Jr. | |
| 4,174,925 A | 11/1979 | Pfenning et al. | |
| 4,182,480 A | 1/1980 | Theyse et al. | |
| 4,197,990 A | 4/1980 | Carberg et al. | |
| 4,205,927 A | 6/1980 | Simmons | |
| 4,227,373 A | 10/1980 | Amend et al. | |
| 4,258,551 A | 3/1981 | Ritzi | |
| 4,259,045 A | 3/1981 | Teruyama | |
| 4,278,200 A | 7/1981 | Gunnewig | |
| 4,298,311 A | 11/1981 | Ritzi | |
| 4,333,748 A | 6/1982 | Erickson | |
| 4,334,592 A | 6/1982 | Fair | |
| 4,336,693 A | 6/1982 | Hays et al. | |
| 4,339,923 A | 7/1982 | Hays et al. | |
| 4,347,900 A | 9/1982 | Barrington | |
| 4,363,608 A | 12/1982 | Mulders | |
| 4,374,583 A | 2/1983 | Barrington | |
| 4,375,975 A | 3/1983 | McNicholas | |
| 4,382,804 A | 5/1983 | Mellor | |
| 4,384,724 A | 5/1983 | Derman et al. | |
| 4,386,780 A * | 6/1983 | Dernedde | 415/121.2 |
| 4,391,102 A | 7/1983 | Studhalter et al. | |
| 4,396,361 A | 8/1983 | Fraser | |
| 4,432,470 A | 2/1984 | Sopha | |
| 4,438,638 A | 3/1984 | Hays et al. | |
| 4,441,322 A | 4/1984 | Ritzi | |
| 4,442,925 A | 4/1984 | Fukushima et al. | |
| 4,453,893 A | 6/1984 | Hutmaker | |
| 4,463,567 A | 8/1984 | Amend et al. | |
| 4,468,234 A | 8/1984 | McNicholas | |
| 4,471,795 A | 9/1984 | Linhardt | |
| 4,477,223 A | 10/1984 | Giroux | |
| 4,502,839 A | 3/1985 | Maddox et al. | |
| 4,511,309 A | 4/1985 | Maddox | |
| 4,531,888 A | 7/1985 | Buchelt | |
| 4,536,134 A | 8/1985 | Huiber | |
| 4,541,531 A | 9/1985 | Brule | |
| 4,541,607 A | 9/1985 | Hotger | |
| 4,573,527 A | 3/1986 | McDonough | |
| 4,574,815 A | 3/1986 | West et al. | |
| 4,648,806 A | 3/1987 | Alexander | |
| 4,687,017 A | 8/1987 | Danko et al. | |
| 4,737,081 A | 4/1988 | Nakajima et al. | |
| 4,752,185 A | 6/1988 | Butler et al. | |
| 4,807,664 A | 2/1989 | Wilson et al. | |
| 4,813,495 A | 3/1989 | Leach | |
| 4,821,737 A | 4/1989 | Nelson | |
| 4,826,403 A | 5/1989 | Catlow | |
| 4,830,331 A | 5/1989 | Vindum | |
| 4,832,709 A | 5/1989 | Nagyszalanczy | |
| 4,904,284 A | 2/1990 | Hanabusa | |
| 4,984,830 A | 1/1991 | Saunders | |
| 5,007,328 A | 4/1991 | Otterman | |
| 5,024,585 A | 6/1991 | Kralovec | |
| 5,043,617 A | 8/1991 | Rostron | |
| 5,044,701 A | 9/1991 | Watanabe et al. | |
| 5,045,046 A | 9/1991 | Bond | |
| 5,054,995 A | 10/1991 | Haseley et al. | |
| 5,064,452 A | 11/1991 | Yano et al. | |
| 5,080,137 A | 1/1992 | Adams | |
| 5,190,440 A | 3/1993 | Maier et al. | |
| 5,202,024 A | 4/1993 | Andersson et al. | |
| 5,202,026 A | 4/1993 | Lema | |
| 5,203,891 A | 4/1993 | Lema | |
| 5,207,810 A | 5/1993 | Sheth | |
| 5,211,427 A | 5/1993 | Washizu | |
| 5,246,346 A | 9/1993 | Schiesser | |
| 5,285,123 A | 2/1994 | Kataoka et al. | |
| 5,306,051 A | 4/1994 | Loker et al. | |
| 5,337,779 A | 8/1994 | Fukuhara | |
| 5,378,121 A | 1/1995 | Hackett | |
| 5,385,446 A | 1/1995 | Hays | |
| 5,421,708 A | 6/1995 | Utter | |
| 5,435,574 A * | 7/1995 | Victor et al. | 277/379 |
| 5,443,581 A | 8/1995 | Malone | |
| 5,484,521 A | 1/1996 | Kramer | |
| 5,496,394 A | 3/1996 | Nied | |
| 5,500,039 A | 3/1996 | Mori et al. | |
| 5,525,034 A | 6/1996 | Hays | |
| 5,525,146 A | 6/1996 | Straub | |
| 5,531,811 A | 7/1996 | Kloberdanz | |
| 5,538,259 A | 7/1996 | Uhrner et al. | |
| 5,542,831 A | 8/1996 | Scarfone | |
| 5,575,309 A | 11/1996 | Connell | |
| 5,585,000 A | 12/1996 | Sassi | |
| 5,605,172 A | 2/1997 | Schubert et al. | |
| 5,628,623 A | 5/1997 | Skaggs | |
| 5,634,492 A | 6/1997 | Steinruck et al. | |
| 5,640,472 A | 6/1997 | Meinzer et al. | |
| 5,641,280 A | 6/1997 | Timuska | |
| 5,653,347 A | 8/1997 | Larsson | |
| 5,664,420 A | 9/1997 | Hays | |
| 5,682,759 A | 11/1997 | Hays | |
| 5,683,235 A | 11/1997 | Welch | |
| 5,685,691 A | 11/1997 | Hays | |
| 5,687,249 A | 11/1997 | Kato | |
| 5,693,125 A * | 12/1997 | Dean | 96/157 |
| 5,703,424 A | 12/1997 | Dorman | |
| 5,709,528 A | 1/1998 | Hablanian | |
| 5,713,720 A | 2/1998 | Barhoum | |
| 5,720,799 A | 2/1998 | Hays | |
| 5,750,040 A | 5/1998 | Hays | |
| 5,775,882 A | 7/1998 | Kiyokawa et al. | |
| 5,779,619 A | 7/1998 | Borgstrom et al. | |
| 5,795,135 A | 8/1998 | Nyilas et al. | |
| 5,800,092 A | 9/1998 | Nill et al. | |
| 5,848,616 A | 12/1998 | Vogel et al. | |
| 5,850,857 A | 12/1998 | Simpson | |
| 5,853,585 A | 12/1998 | Nesseth | |
| 5,863,023 A | 1/1999 | Evans et al. | |
| 5,899,435 A | 5/1999 | Mitsch et al. | |

| Patent Number | Date | Inventor(s) | Patent Number | Date | Inventor(s) |
|---|---|---|---|---|---|
| 5,935,053 A | 8/1999 | Strid | 7,033,410 B2 | 4/2006 | Hilpert et al. |
| 5,938,803 A | 8/1999 | Dries | 7,033,411 B2 | 4/2006 | Carlsson et al. |
| 5,938,819 A | 8/1999 | Seery | 7,056,363 B2 | 6/2006 | Carlsson et al. |
| 5,946,915 A | 9/1999 | Hays | 7,063,465 B1 | 6/2006 | Wilkes et al. |
| 5,951,066 A | 9/1999 | Lane et al. | 7,112,036 B2 | 9/2006 | Lubell et al. |
| 5,965,022 A | 10/1999 | Gould | 7,131,292 B2 | 11/2006 | Ikegami et al. |
| 5,967,746 A | 10/1999 | Hagi et al. | 7,144,226 B2 | 12/2006 | Pugnet et al. |
| 5,971,702 A | 10/1999 | Afton et al. | 7,159,723 B2 | 1/2007 | Hilpert et al. |
| 5,971,907 A | 10/1999 | Johannemann et al. | 7,160,518 B2 | 1/2007 | Chen et al. |
| 5,980,218 A | 11/1999 | Takahashi et al. | 7,169,305 B2 | 1/2007 | Gomez |
| 5,988,524 A | 11/1999 | Odajima et al. | 7,185,447 B2 | 3/2007 | Arbeiter |
| 6,035,934 A | 3/2000 | Stevenson et al. | 7,204,241 B2 | 4/2007 | Thompson |
| 6,059,539 A | 5/2000 | Nyilas et al. | 7,241,392 B2 | 7/2007 | Maier |
| 6,068,447 A | 5/2000 | Foege | 7,244,111 B2 | 7/2007 | Suter et al. |
| 6,090,174 A | 7/2000 | Douma et al. | 7,258,713 B2 | 8/2007 | Eubank et al. |
| 6,090,299 A | 7/2000 | Hays et al. | 7,270,145 B2 | 9/2007 | Koezler |
| 6,113,675 A | 9/2000 | Branstetter | 7,288,202 B2 | 10/2007 | Maier |
| 6,122,915 A | 9/2000 | Hays | 7,314,560 B2 | 1/2008 | Yoshida et al. |
| 6,123,363 A | 9/2000 | Burgard et al. | 7,323,023 B2 | 1/2008 | Michele et al. |
| 6,145,844 A | 11/2000 | Waggott | 7,328,749 B2 | 2/2008 | Reitz |
| 6,149,825 A | 11/2000 | Gargas | 7,335,313 B2 | 2/2008 | Moya |
| 6,151,881 A | 11/2000 | Ai et al. | 7,377,110 B2 | 5/2008 | Sheridan et al. |
| 6,196,962 B1 | 3/2001 | Purvey et al. | 7,381,235 B2 | 6/2008 | Koene et al. |
| 6,206,202 B1 | 3/2001 | Galk et al. | 7,396,373 B2 | 7/2008 | Lagerstedt et al. |
| 6,214,075 B1 | 4/2001 | Filges et al. | 7,399,412 B2 | 7/2008 | Keuschnigg |
| 6,217,637 B1 | 4/2001 | Toney et al. | 7,435,290 B2 | 10/2008 | Lane et al. |
| 6,227,379 B1 | 5/2001 | Nesseth | 7,445,653 B2 | 11/2008 | Trautmann et al. |
| 6,277,278 B1 | 8/2001 | Conrad et al. | 7,470,299 B2 | 12/2008 | Han et al. |
| 6,312,021 B1 | 11/2001 | Thomas | 7,473,083 B2 | 1/2009 | Oh et al. |
| 6,314,738 B1 | 11/2001 | Hays | 7,479,171 B2 | 1/2009 | Cho et al. |
| 6,372,006 B1 | 4/2002 | Pregenzer et al. | 7,494,523 B2 | 2/2009 | Oh et al. |
| 6,375,437 B1 | 4/2002 | Nolan | 7,501,002 B2 | 3/2009 | Han et al. |
| 6,383,262 B1 | 5/2002 | Marthinsen et al. | 7,520,210 B2 | 4/2009 | Theodore, Jr. et al. |
| 6,394,764 B1 | 5/2002 | Samurin | 7,575,422 B2 | 8/2009 | Bode et al. |
| 6,398,973 B1 | 6/2002 | Saunders et al. | 7,578,863 B2 | 8/2009 | Becker et al. |
| 6,402,465 B1 | 6/2002 | Maier | 7,591,882 B2 | 9/2009 | Harazim |
| 6,426,010 B1 | 7/2002 | Lecoffre et al. | 7,594,941 B2 | 9/2009 | Zheng et al. |
| 6,464,469 B1 | 10/2002 | Grob et al. | 7,594,942 B2 | 9/2009 | Polderman |
| 6,467,988 B1 | 10/2002 | Czachor et al. | 7,610,955 B2 | 11/2009 | Irwin, Jr. |
| 6,468,426 B1 | 10/2002 | Klass | 7,628,836 B2 | 12/2009 | Baronet et al. |
| 6,485,536 B1 | 11/2002 | Masters | 7,637,699 B2 | 12/2009 | Albrecht |
| 6,530,484 B1 | 3/2003 | Bosman | 7,674,377 B2 | 3/2010 | Crew |
| 6,530,979 B2 | 3/2003 | Firey | 7,677,308 B2 | 3/2010 | Kolle |
| 6,531,066 B1 | 3/2003 | Saunders et al. | 7,708,537 B2 | 5/2010 | Bhatia et al. |
| 6,537,035 B2 | 3/2003 | Shumway | 7,708,808 B1 | 5/2010 | Heumann |
| 6,540,917 B1 | 4/2003 | Rachels et al. | 7,744,663 B2 | 6/2010 | Wallace |
| 6,547,037 B2 | 4/2003 | Kuzdzal | 7,748,079 B2 | 7/2010 | McDowell et al. |
| 6,592,654 B2 | 7/2003 | Brown | 7,766,989 B2 | 8/2010 | Lane et al. |
| 6,596,046 B2 | 7/2003 | Conrad et al. | 7,811,344 B1 | 10/2010 | Duke et al. |
| 6,599,086 B2 | 7/2003 | Soja | 7,811,347 B2 | 10/2010 | Carlsson et al. |
| 6,607,348 B2 | 8/2003 | Jean | 7,815,415 B2 | 10/2010 | Kanezawa et al. |
| 6,616,719 B1 | 9/2003 | Sun et al. | 7,824,458 B2 | 11/2010 | Borgstrom et al. |
| 6,617,731 B1 | 9/2003 | Goodnick | 7,824,459 B2 | 11/2010 | Borgstrom et al. |
| 6,629,825 B2 | 10/2003 | Stickland et al. | 7,846,228 B1 | 12/2010 | Saaski et al. |
| 6,631,617 B1 | 10/2003 | Dreiman et al. | 2001/0007283 A1 | 7/2001 | Johal et al. |
| 6,658,986 B2 | 12/2003 | Pitla et al. | 2002/0009361 A1 | 1/2002 | Reichert et al. |
| 6,659,143 B1 | 12/2003 | Taylor et al. | 2003/0029318 A1 | 2/2003 | Firey |
| 6,669,845 B2 | 12/2003 | Klass | 2003/0035718 A1* | 2/2003 | Langston et al. ............ 415/123 |
| 6,688,802 B2 | 2/2004 | Ross et al. | 2003/0136094 A1 | 7/2003 | Illingworth et al. |
| 6,707,200 B2 | 3/2004 | Carroll et al. | 2004/0007261 A1 | 1/2004 | Cornwell |
| 6,718,955 B1 | 4/2004 | Knight | 2004/0170505 A1 | 9/2004 | Lenderink et al. |
| 6,719,830 B2 | 4/2004 | Illingworth et al. | 2005/0173337 A1 | 8/2005 | Costinel |
| 6,764,284 B2 | 7/2004 | Oehman, Jr. | 2006/0065609 A1 | 3/2006 | Arthur |
| 6,776,812 B2 | 8/2004 | Komura et al. | 2006/0090430 A1 | 5/2006 | Trautman et al. |
| 6,802,693 B2 | 10/2004 | Reinfeld et al. | 2006/0096933 A1 | 5/2006 | Maier |
| 6,802,881 B2 | 10/2004 | Illingworth et al. | 2006/0157251 A1 | 7/2006 | Stinessen et al. |
| 6,811,713 B2 | 11/2004 | Arnaud | 2006/0157406 A1* | 7/2006 | Maier ........................ 210/512.1 |
| 6,817,846 B2 | 11/2004 | Bennitt | 2006/0193728 A1 | 8/2006 | Lindsey et al. |
| 6,837,913 B2 | 1/2005 | Schilling et al. | 2006/0222515 A1 | 10/2006 | Delmotte et al. |
| 6,843,836 B2 | 1/2005 | Kitchener | 2006/0230933 A1 | 10/2006 | Harazim |
| 6,878,187 B1 | 4/2005 | Hays et al. | 2006/0239831 A1 | 10/2006 | Garris, Jr. |
| 6,893,208 B2 | 5/2005 | Frosini et al. | 2006/0254659 A1 | 11/2006 | Ballot et al. |
| 6,907,933 B2 | 6/2005 | Choi et al. | 2006/0275160 A1 | 12/2006 | Leu et al. |
| 6,979,358 B2 | 12/2005 | Ekker | 2007/0029091 A1 | 2/2007 | Stinessen et al. |
| 7,001,448 B1 | 2/2006 | West | 2007/0036646 A1 | 2/2007 | Nguyen et al. |
| 7,013,978 B2 | 3/2006 | Appleford et al. | 2007/0051245 A1 | 3/2007 | Yun |
| 7,022,150 B2 | 4/2006 | Borgstrom et al. | 2007/0062374 A1 | 3/2007 | Kolle |
| 7,022,153 B2 | 4/2006 | McKenzie | 2007/0065317 A1 | 3/2007 | Stock |
| 7,025,890 B2 | 4/2006 | Moya | 2007/0084340 A1 | 4/2007 | Dou et al. |

| | | | |
|---|---|---|---|
| 2007/0140870 | A1 | 6/2007 | Fukanuma et al. |
| 2007/0151922 | A1 | 7/2007 | Mian |
| 2007/0163215 | A1 | 7/2007 | Lagerstadt |
| 2007/0172363 | A1 | 7/2007 | Laboube et al. |
| 2007/0196215 | A1 | 8/2007 | Frosini et al. |
| 2007/0227969 | A1 | 10/2007 | Dehaene et al. |
| 2007/0294986 | A1 | 12/2007 | Beetz |
| 2008/0031732 | A1 | 2/2008 | Peer et al. |
| 2008/0039732 | A9 | 2/2008 | Bowman |
| 2008/0246281 | A1 | 10/2008 | Agrawal et al. |
| 2008/0315812 | A1 | 12/2008 | Balboul |
| 2009/0013658 | A1 | 1/2009 | Borgstrom et al. |
| 2009/0015012 | A1 | 1/2009 | Metzler et al. |
| 2009/0025562 | A1 | 1/2009 | Hallgren et al. |
| 2009/0025563 | A1 | 1/2009 | Borgstrom et al. |
| 2009/0151928 | A1 | 6/2009 | Lawson |
| 2009/0159523 | A1 | 6/2009 | McCutchen |
| 2009/0169407 | A1 | 7/2009 | Yun |
| 2009/0173095 | A1 | 7/2009 | Bhatia et al. |
| 2009/0266231 | A1 | 10/2009 | Franzen et al. |
| 2009/0304496 | A1 | 12/2009 | Maier |
| 2009/0321343 | A1 | 12/2009 | Maier |
| 2009/0324391 | A1 | 12/2009 | Maier |
| 2010/0007133 | A1 | 1/2010 | Maier |
| 2010/0021292 | A1 | 1/2010 | Maier et al. |
| 2010/0038309 | A1 | 2/2010 | Maier |
| 2010/0043288 | A1 | 2/2010 | Wallace |
| 2010/0043364 | A1 | 2/2010 | Curien |
| 2010/0044966 | A1 | 2/2010 | Majot et al. |
| 2010/0072121 | A1 | 3/2010 | Maier |
| 2010/0074768 | A1 | 3/2010 | Maier |
| 2010/0083690 | A1 | 4/2010 | Sato et al. |
| 2010/0090087 | A1 | 4/2010 | Maier |
| 2010/0143172 | A1 | 6/2010 | Sato et al. |
| 2010/0163232 | A1 | 7/2010 | Kolle |
| 2010/0183438 | A1 | 7/2010 | Maier et al. |
| 2010/0239419 | A1 | 9/2010 | Maier et al. |
| 2010/0239437 | A1 | 9/2010 | Maier |
| 2010/0247299 | A1 | 9/2010 | Maier |
| 2010/0257827 | A1 | 10/2010 | Lane et al. |
| 2011/0017307 | A1 | 1/2011 | Kidd et al. |
| 2011/0061536 | A1 | 3/2011 | Maier et al. |

FOREIGN PATENT DOCUMENTS

| | | |
|---|---|---|
| EP | 1582703 | 10/2005 |
| GB | 2323639 | 9/1998 |
| GB | 2337561 | 11/1999 |
| JP | 54099206 | 1/1978 |
| JP | 08 068501 | 3/1996 |
| JP | 8-284961 A | 11/1996 |
| JP | 2002 242699 | 8/2002 |
| JP | 2005291202 | 10/2005 |
| KR | 2009085521 | 2/2008 |
| MX | 2008012579 | 12/2008 |
| WO | 9524563 | 9/1995 |
| WO | 0117096 | 3/2001 |
| WO | 2007043889 | 4/2007 |
| WO | 2007103248 | 9/2007 |
| WO | 2007120506 | 10/2007 |
| WO | 2008036221 | 3/2008 |
| WO | 2008039446 | 3/2008 |
| WO | 2008039491 | 4/2008 |
| WO | 2008039731 | 4/2008 |
| WO | 2008039732 | 4/2008 |
| WO | 2008039733 | 4/2008 |
| WO | 2008039734 | 4/2008 |
| WO | 2008036394 | 7/2008 |
| WO | 2009111616 | 9/2009 |
| WO | 2009158252 | 12/2009 |
| WO | 2009158253 | 12/2009 |
| WO | 2010083416 | 7/2010 |
| WO | 2010083427 | 7/2010 |
| WO | 2010107579 | 9/2010 |
| WO | 2010110992 | 9/2010 |
| WO | 2011034764 | 3/2011 |

OTHER PUBLICATIONS

PCT/US2007/008149 International Search Report and Written Opinion dated Jul. 17, 2008.
PCT/US2007/020101 International Preliminary Report on Patentability dated Apr. 2, 2009.
PCT/US2007/020101 International Search Report dated Apr. 29, 2008.
PCT/US2007/020101 Written Opinion dated Mar. 19, 2009.
PCT/US2007/020471 International Preliminary Report on Patentability dated Apr. 2, 2009.
PCT/US2007/020471 International Search Report and Written Opinion dated Apr. 1, 2008.
PCT/US2007/020659 International Preliminary Report on Patentability dated Mar. 31, 2009.
PCT/US2007/020659 International Search Report and Written Opinion dated Sep. 17, 2008.
PCT/US2007/020768 International Preliminary Report on Patentability dated Mar. 31, 2009.
PCT/US2007/020768 International Search Report and Written Opinion dated Mar. 3, 2008.
PCT/US2007/079348 International Preliminary Report on Patentability dated Mar. 31, 2009.
PCT/US2007/079348 International Search Report dated Apr. 11, 2008.
PCT/US2007/079348 Written Opinion dated Jan. 25, 2008.
PCT/US2007/079349 International Preliminary Report on Patentability dated Mar. 31, 2009.
PCT/US2007/079349 International Search Report and Written Opinion dated Apr. 2, 2008.
PCT/US2007/079350 International Preliminary Report on Patentability dated Mar. 31, 2009.
PCT/US2007/079350 International Search Report dated Jul. 17, 2008.
PCT/US2007/079350 Written Opinion dated Mar. 25, 2009.
PCT/US2007/079352 International Preliminary Report on Patentability dated Mar. 31, 2009.
PCT/US2007/079352 International Search Report and Written Opinion dated Aug. 27, 2008.
PCT/US2009/036142 International Preliminary Report on Patentability dated Sep. 16, 2010.
PCT/US2009/036142 International Search Report dated Jan. 7, 2010.
PCT/US2009/036142 Written Opinion dated May 11, 2009.
PCT/US2009/047662 International Preliminary Report on Patentability dated Jan. 13, 2011.
PCT/US2009/047662 Written Opinion dated Aug. 20, 2009.
PCT/US2010/021199 International Search Report and Written Opinion dated Mar. 22, 2010.
PCT/US2010/021199 International Preliminary Report on Patentability dated Mar. 29, 2011.
PCT/US2010/021218 International Search Report and Written Opinion dated Mar. 23, 2010.
PCT/US2010/021218 International Report on Patentability dated Feb. 2, 2011.
PCT/US2010/025650 International Search Report and Written Opinion dated Apr. 22, 2010.
PCT/US2010/025650 International Report on Patentability dated Mar. 14, 2011.
PCT/US2010/025952 International Search Report and Written Opinion dated Apr. 12, 2010.
PCT/US2010/025952 International Report on Patentability dated Mar. 14, 2011.
PCT/US2009/047667 International Report on Patentability dated Jan. 13, 2011.
PCT/US2009/047667 Written Opinion dated Aug. 7, 2009.
PCT/US2009/047667 International Search Report dated Dec. 30, 2009.
Dresser-Rand, Inc. "High Pressure Air Compressor Model 13NL45," Oct. 28, 1991, 14 pages.
Technical Manual—High Pressure Air Compressor Model 13NL45; Navsea S6220-AT-MMA-010/93236, pp. 3-23 to 3-32, Electric Boat Corporation, Groton, CT 06340, Oct. 28, 1991.
International Search Report of the International Searching Authority for Patent Cooperation Treaty Application No. PCT/US2007/020101, dated Apr. 29, 2008, pp. 1-2.

* cited by examiner

ROTARY SEPARATOR DRUM SEAL

CROSS REFERENCE

This application is a United States national phase application of co-pending international patent application number PCT/US2007/020101, filed Sep. 17, 2007, which claims priority to U.S. Provisional Patent Application No. 60/845,614, filed Sep. 19, 2006, the disclosures of which are incorporated herein by reference.

The present invention relates to fluid machinery, and more particularly to seal assemblies for rotary fluid separators.

Rotary separators for separating solids from fluids, liquids from gases, or/and gases or liquids of varying density are known. Such rotary separators typically include a rotatable tubular body or "drum" having a central bore with inlet and outlet ends. With this structure, fluid flow enters the inlet end and passes through the bore, such that heavier fluids (e.g., liquids) are directed outwardly onto a drum inner surface, and generally pass through openings therethrough for collection, while the lighter fluids (e.g., gas) pass through an outlet end of the drum. Typically, fluid flow out of the drum outlet is directed into one or more passages, such as an inlet of a compressor or an outlet pipe of a "stand alone" separator device.

To prevent inflow of inlet fluids to the outlet flow, and thus preventing remixing of separated fluids (e.g., liquids), the drum outlet end is normally sealed against a static member located adjacent to the drum. Such a static member may be a partition wall (e.g., diaphragm) in a fluid machine, an inlet wall of a compressor, a casing wall of a stand alone separator, etc. As there must be some clearance between the drum end and the static member to allow free rotation of the drum, the seal between the drum and static member is typically non-contact. However, with previously known seal designs, there is a risk of undesired separated fluids (e.g., liquids) from passing through the clearance space and back into the outlet fluid stream.

SUMMARY OF THE INVENTION

In one aspect, the present invention is a seal assembly for a fluid machine including a casing and a shaft disposed within the casing so as to be rotatable about a central axis. The seal assembly comprises a static member generally fixedly disposed within the casing and having an end surface and a rotatable member coupled with the shaft and spaced axially from the static member. The rotatable member has an axial end with a generally radial end surface extending circumferentially about the shaft axis, the rotatable member end surface being located adjacent to and facing the static member end surface such that a clearance space is defined generally between the two end surfaces. The rotatable member further has a plurality of openings extending generally axially inwardly from the rotatable member end surface and spaced circumferentially about the shaft axis such that land surface sections are defined on the end surface. The land surface sections or/and the openings are configured to at least generally prevent fluid flow radially inwardly through the clearance space.

In another aspect, the present invention is a compressor comprising a casing, a shaft disposed within the casing so as to be rotatable about a central axis, and at least one impeller mounted on the shaft and disposed within the casing, the at least one impeller having an inlet and an outlet. A static member is generally fixedly disposed within the casing and has an end surface and a separator member coupled with the shaft and spaced axially from the static member. The separator member has an axial end with a generally radial end surface extending circumferentially about the shaft axis, the separator member end surface being located adjacent to and facing the static member end surface such that a clearance space is defined generally between the two end surfaces. The compressor further includes at least one and preferably all of the following "sealing" elements: 1) a plurality of openings extending generally axially inwardly from the separator member end surface and spaced circumferentially about the shaft axis such that land surface sections are defined on the end surface, at least one of the land surface sections and the openings being configured to at least generally prevent fluid flow through the clearance space; 2) at least one outer generally annular ridge extending from an inner circumferential surface of the static member and toward an outer circumferential surface of the separator member; 3) at least one inner generally annular ridge extending from an outer circumferential surface of the static member and toward an inner circumferential surface of the separator member; 4) inner and outer generally annular wall sections each extending generally axially from the static member axial end and toward the separator member, the inner and outer annular wall sections defining a generally annular pocket configured to receive a portion of the separator outlet end; and 5) a generally annular deflector portion extending generally axially and generally radially outwardly from the axial end and extending circumferentially about the shaft central axis, the deflector portion being spaced radially outwardly from the static member end surface and having an angled surface facing generally toward the central axis and away from the static member end surface.

In a further aspect, the present invention is a seal assembly for a fluid machine including a casing and a shaft disposed within the casing so as to be rotatable about a central axis. The seal assembly includes a static member generally fixedly disposed within the casing and having an axial end with an end surface and inner and outer generally annular wall sections each extending generally axially from the static member axial end and toward the separator member. The end surface extends between the inner and outer annular wall sections and the two wall sections defining a generally annular pocket. A rotatable member is coupled with the shaft and is spaced axially from the static member and has inner and outer circumferential surfaces and axial end with a generally radial end surface extending circumferentially about the shaft axis. The rotatable member end surface being located adjacent to and facing the static member end surface such that a clearance space is defined generally between the two end surfaces and a portion of the rotatable member axial end is disposed within the static member pocket. Further, the static member also includes at least one inner generally annular ridge extending radially outwardly from the static member inner annular wall section toward the rotatable member inner surface, the inner annular ridge being configured to provide a labyrinth seal for at least generally inhibiting fluid flow between the static member inner annular wall section and the rotatable member inner surface. Also, the static member includes at least one outer generally annular ridge extending radially inwardly from the static member outer annular wall section toward the rotatable member outer surface, the outer annular ridge being configured to provide a labyrinth seal for at least generally inhibiting fluid flow between the static member outer annular wall section and the rotatable member outer surface.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Figure 1:
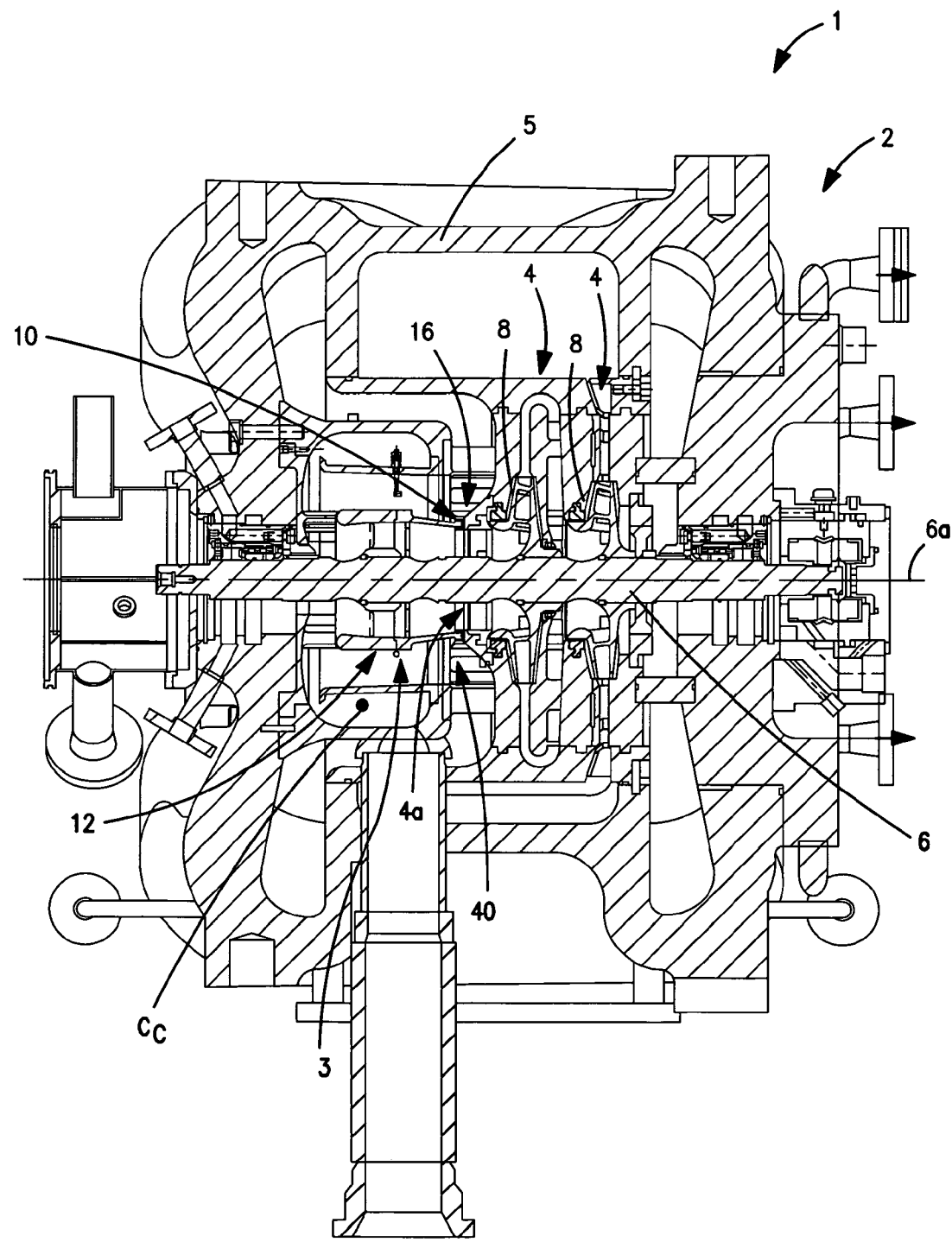
FIG. 1 is an axial cross-sectional view of a combination separator and compressor device including a seal and fluid handling assembly in accordance with the present invention.

Certain terminology is used in the following description for convenience only and is not limiting. The words "right", "left", "lower", "upper", "upward", "down" and "downward" designate directions in the drawings to which reference is made. The words "inner", "inwardly" and "outer", "outwardly" refer to directions toward and away from, respectively, a designated centerline or a geometric center of an element being described, the particular meaning being readily apparent from the context of the description. Further, as used herein, the word "connected" is intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-8 a seal assembly 10 for a fluid machine 1, preferably a compressor 2 with a rotatable separator 3 located at the inlet 4a of a first (or sole) compression stage 4, as described below. The fluid machine 1 preferably includes a casing 5 and a shaft 6 disposed at least partially within the casing 5 so as be rotatable about a central axis 6a. The seal assembly 10 basically comprises a rotatable member 12, a static member 16, and one or more "sealing elements" formed in or on the static rotatable member 12 or the static member 16, as described below. More specifically, the static member 16 is generally fixedly disposed within the casing 5 and has an axial end 18 with an end surface 19 extending circumferentially about the axis 6a. The rotatable member 12 is coupled with the shaft 6 and spaced axially from the static member 16, the rotatable member 12 having an axial end 14 with a generally radial end surface 15 extending about the axis 6a and located generally adjacent to and facing the static member end surface 19 such that a clearance space $S_c$ is defined between the two surfaces 15, 19. Further, the seal assembly 10 includes at least one and preferably all of the following "sealing" elements/components:

1) a plurality of openings 20 in the end surface 15 of the rotatable member 12 forming labyrinth teeth for sealing the clearance space $S_C$;

2) one or more outer annular ridges 34 extending inwardly from an inner circumferential surface 29 of the static member 16 toward an outer surface 58b of the rotatable member 12, or/and one or more inner annular ridges 32 extending outwardly from an outer circumferential surface 27 of the static member 16 and toward an inner surface 58a of the static member 16, so as to form labyrinth seal between the two surfaces 29/58b or/and 31/58a;

3) a "pocket" 30 formed in the static member axial end 18 for receiving a portion 58 of the rotatable member axial end 14; and 4) an annular deflector wall 36 extending from the static member axial end 18 and spaced radially outwardly from the rotatable member for deflecting flow from the interface $I_S$ between the rotatable and static member end surfaces 15, 19.

Although preferably including all four of the above elements or components, the seal assembly 10 of the present invention may include any one or more of these elements/components, e.g., only the rotating "radial" labyrinth teeth formed by the rotatable member end openings 20.

Referring to FIGS. 4-7, the plurality of openings 20 of the rotatable member 12 are formed in the axial end 14 such that each opening 20 extends generally axially into the rotatable member 12 from the member radial end surface 15 and spaced circumferentially about the end surface 15. Preferably, each one of the plurality of openings 20 of the rotatable member 12 is formed as a generally circular hole 23 having an enclosed inner end 23a, but may have any other appropriate shape (e.g., elliptical) or/and may be formed as a "through hole" (no alternatives shown). Further, the openings 20 are preferably arranged in at least first and second generally circular rows of openings 20, most preferably three rows $R_1$, $R_2$, $R_3$ (see FIG. 6), such that the openings 20 "occupy" a substantial portion of the member end surface 15. The second row $R_3$ of openings 20 are spaced radially outwardly from the first row R.sub.1 of openings 20 and the third row $R_3$ of openings 20 is spaced radially outwardly from both the first and second rows $R_1$, $R_2$. Preferably, each opening 20 in the first row $R_1$ of openings 20 is generally radially aligned with a separate one of the openings 20 of the second row $R_1$ and a separate opening 20 of the third row $R_3$. However, the openings 20 may be alternatively arranged such that the openings 20 in the two or more rows $R_N$ are radially non-aligned or "staggered".

Further, the openings 20 define a plurality of land sections or "lands" 22 between the openings 20 on the end surface 15, which are slidably displaceable generally against the static member end surface 19 during rotation of the rotatable member 12. The lands 22 and/or the openings 20 are configured to at least generally prevent fluid flow through the clearance space $C_S$ between the rotatable and static members 12, 16, respectively. Specifically, the lands 22 and openings 20 are configured to provide a "radial" labyrinth seal 21 between the rotatable member end surface 15 and the static member end surface 19, in which the lands 22 function as "labyrinth teeth". In other words, the outer ends 22a of each land or tooth 22 is located in close proximity to the static member end surface 19, so as to limit the space available for flow between the facing end surfaces 17, 19, and the openings 20 act as chambers for "capturing" any fluid penetrating past the lands/teeth 22 for subsequent ejection by centrifugal forces generated by the rotation of the member 12. Specifically, each one of the plurality of openings 20 is configured to collect liquid directed into the opening 20 and to subsequently direct collected liquid out of the opening 20 and radially outwardly away from the central axis 6a during rotation of the rotatable member 12. That is, at least a portion of any liquid entering between the lands 22 and the static member end surface 19 tends to be pulled into the openings 20 during rotation of the rotatable member 12, both preventing the particular liquid portion from flowing through the clearance space $S_C$ (FIG. 7) and acting as a barrier against further liquid flow through the space $S_C$.

Figure 6:
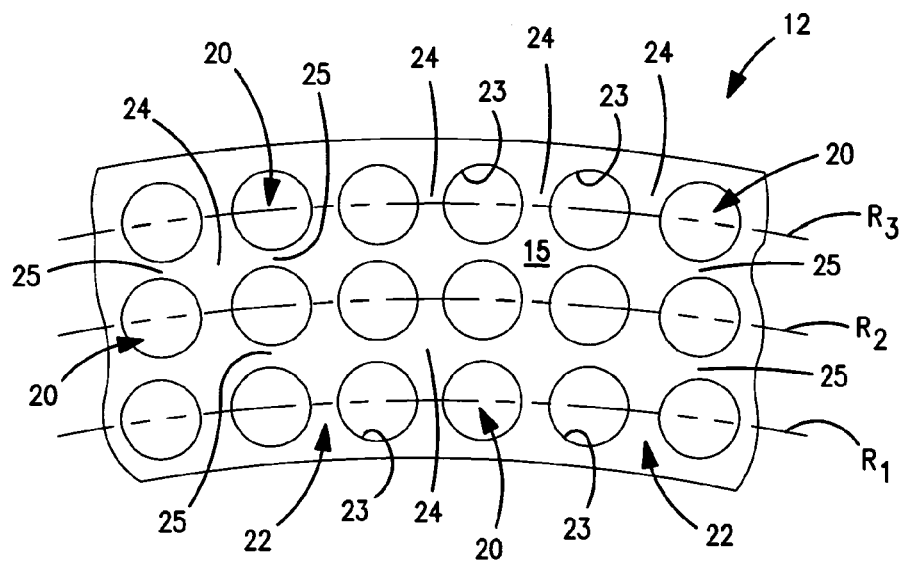
FIG. 6 is a broken-away, side plan view of a separator end surface taken at line 6-6 of FIG. 5.

As best shown in FIG. 6, the lands 22 include both radially-extending or radial portions 24 and circumferentially-extending or circumferential portions 25. The land radial portions 24 are each configured to direct or "sling" liquid contacting the land radial portion 24 radially outwardly from the central axis 6a during rotation of the rotatable member 12. Also, the land circumferential portions 25 are configured to direct liquid contacting the circumferential portions 25 either towards a proximal radial portion 24 for subsequent "slinging" out of the clearance space $S_C$, or into at least one of the plurality of openings 20 so as to generally prevent liquid flow through the clearance space $S_C$.

Thus, centrifugal forces act on liquid captured in the openings 20 or disposed on the lands 22 such that the liquid is directed radially outwardly away from central axis 22. Specifically, centrifugal force causes the land radial portions 24 to sling liquid located therein radially outwardly, as described above, and also tending to push liquid in the openings 20 onto the lands 22. That is, centrifugal force causes liquid located in the openings 20 to flow in a radially outward direction out of the opening 20 and onto adjacent land portions 24 or 25 for subsequent slinging therefrom.

Figure 4:
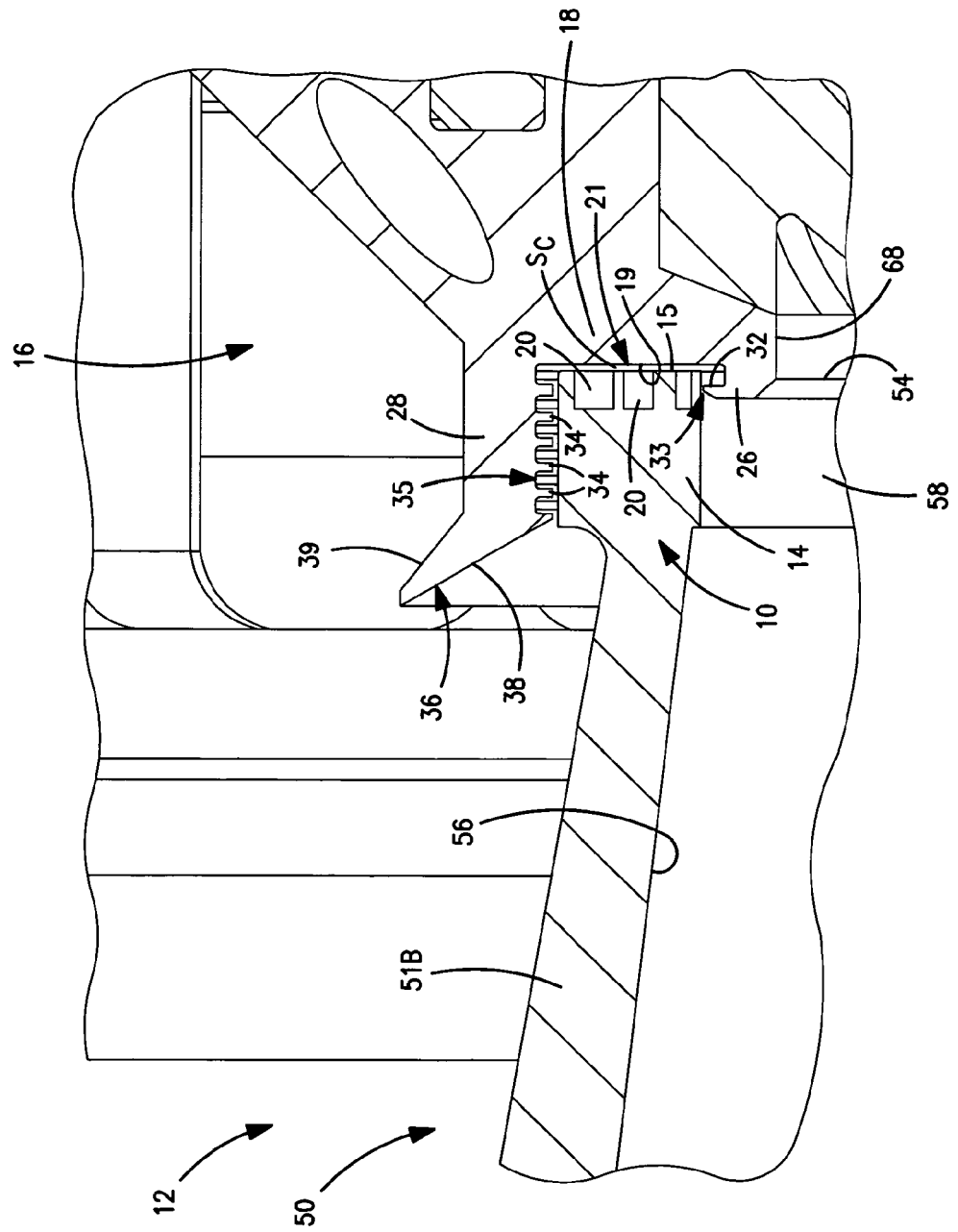
FIG. 4 is a greatly enlarged, broken-away axial cross-sectional view of an interface between the separator member and the static member.
Figure 5:
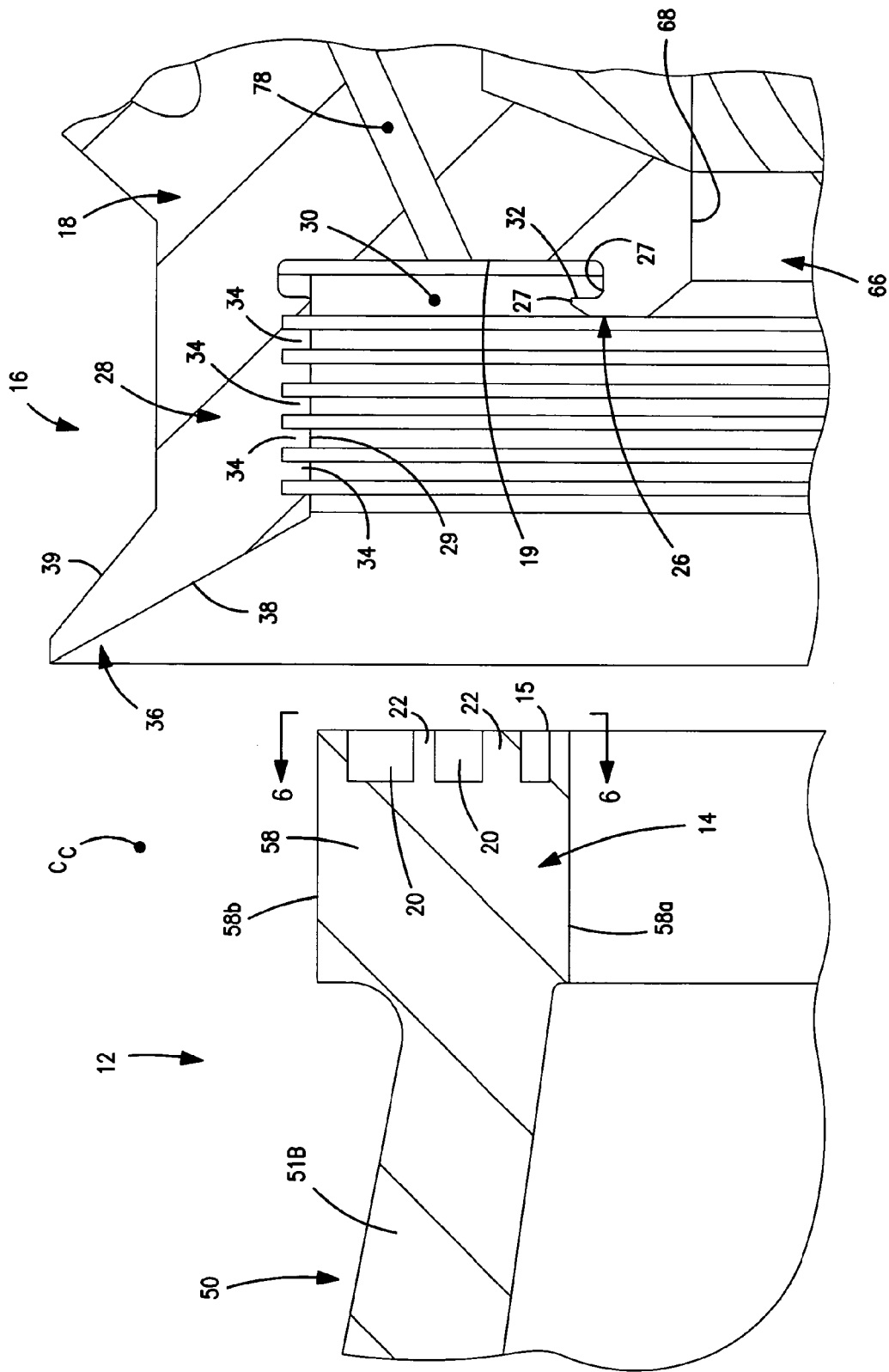
FIG. 5 is an even more greatly enlarged, broken away view of a portion of the separator member and the static member, shown spaced apart to better illustrate portions of the seal.
Figure 7:
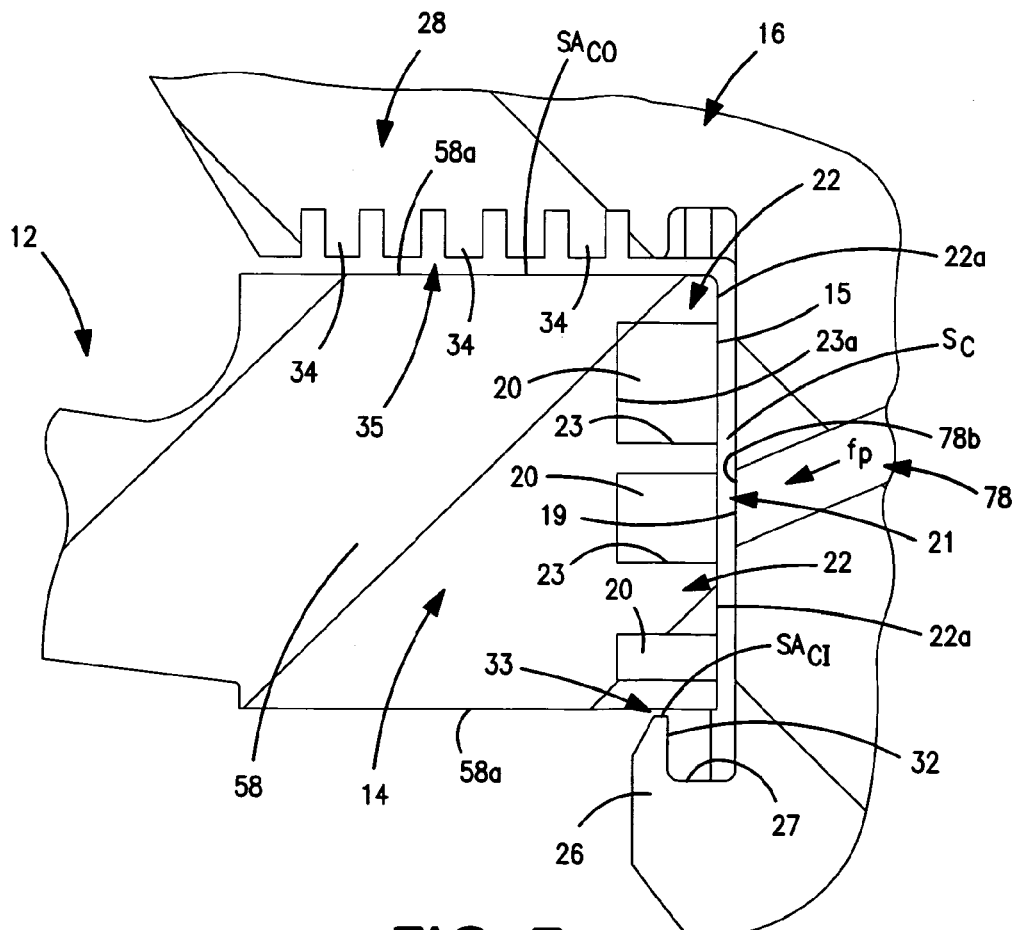
FIG. 7 is a very greatly enlarged, broken-away axial cross-sectional view of the seal at the interface between the separator and static member.

Referring now to FIGS. 4, 5 and 7, the seal assembly 10 preferably further comprises a first, inner annular wall section 26 and a second, outer generally annular wall section 28 spaced radially outwardly from the first annular wall section 26, each annular wall section 26, 28 extending generally axially from the static member axial end 18 and generally toward the rotatable member 12. The inner wall section 26 has an outer circumferential surface 27 and the outer annular wall section 28 has an inner circumferential surface 29, the inner and outer wall surfaces 27, 29 defining a generally annular pocket 30 (FIG. 5) sized to receive a portion 58 of the rotatable member axial end 14, as described below. Preferably, the seal assembly 10 further comprises at least one generally annular ridge 32 extending outwardly from the inner wall section 26 and at least one and preferably a plurality of generally annular inner ridges 34 extending inwardly from the outer wall section 26, each ridge 32, 34 extending circumferentially about the central axis 6a. The inner and outer annular ridges 32, 34 each extend toward the rotatable member portion 58 located in the pocket 30 and are configured to provide inner and outer "circumferential" labyrinth seals 33, 35, respectively, between the annular wall sections 26, 28 and the rotatable member 12.

More specifically, the inner ridge(s) 32 are configured to provide an inner circumferential labyrinth seal 33 to generally prevent or at least inhibit flow through an inner annular clearance space $SA_{CI}$, (FIG. 7) between the inner annular wall section 26 and an inner circumferential surface 58a of the rotatable member 12. Further, the outer ridge(s) 34 are configured to provide an outer circumferential labyrinth seal 35 preventing/inhibiting flow through an outer annular clearance space $SA_{CO}$ (FIG. 7) between the outer annular wall section 28 and an outer circumferential surface 58b of the rotatable member 12.

Although depicted in the drawings as having labyrinth ridges or teeth 32, 34 formed by providing annular grooves in the inner and outer annular walls 26, 28 (e.g., by cutting, milling, etc.), the ridges/teeth 32, 34 may alternatively be formed by providing annular projections extending outwardly from remaining wall sections (e.g., casting, molding, etc.) or in any other appropriate manner. Further, although the drawings depict the inner ridge 32 as being of generally uniform size and having generally V-shaped axial cross-sections and the outer ridges as having generally rectangular axial cross-sections (see, e.g., FIG. 5), the ridges/teeth 32, 34 may have any appropriate shape, such as for example, generally semi-circular, or may be "staggered" or unevenly spaced.

Figure 3:
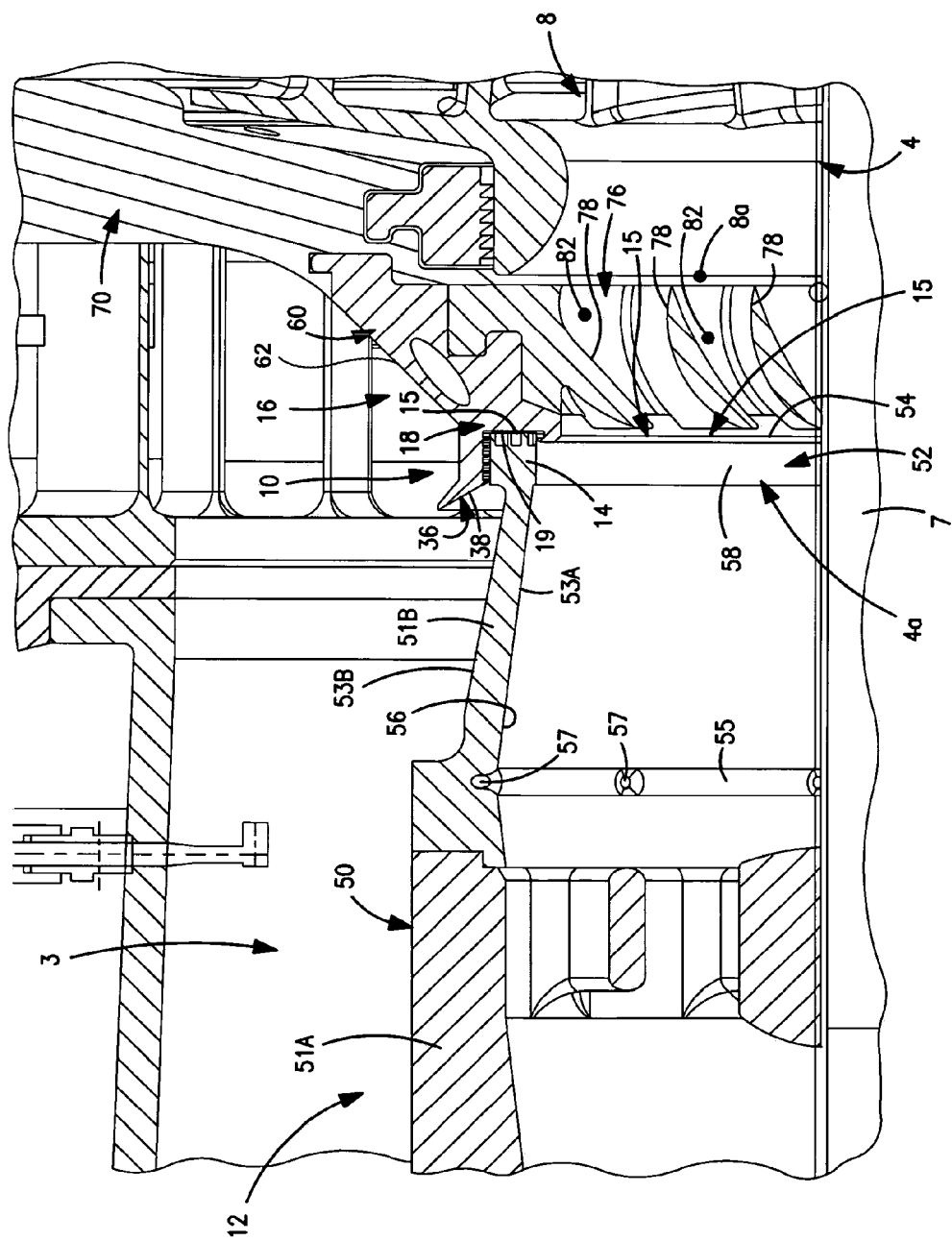
FIG. 3 is a more enlarged, broken-away axial cross-sectional view of the separator and a static member forming a compressor inlet.

Referring to FIGS. 3-5, the seal assembly 10 also preferably comprises a deflector portion or "deflector" 36 extending axially and radially outwardly from the static member outer wall section 28. The deflector 36 is generally annular and extends generally axially and generally radially outwardly from the static member axial end 18, and extends circumferentially about the shaft central axis 6a. The deflector 36 is spaced radially outwardly from the static member end surface 19 and has an angled surface 38 facing generally toward the central axis 6a and away from the static member end surface 19. With this structure, the deflector surface 38 is configured to generally deflect any liquid contacting the surface 38 in a direction generally away from the rotatable member axial end 30. As such, the deflector 36 functions to at least generally inhibit or prevent liquid located externally of the rotatable member 12 from entering the clearance space $S_C$. Preferably, the deflector 36 also has an outer angled surface 39 facing generally radially outwardly and away from the central axis 6a, which preferably has a slope (not indicated) that is less "steep" as compared to the inner angled surface 38. The outer angled surface 39 acts to deflect the main fluid stream flowing externally of the rotatable member 12 generally upward and away from the interface $I_S$ between the rotatable and static members 12, 14.

As discussed above, although the seal assembly 10 preferably includes all of the above-noted components, specifically the axial holes 20 and lands 22 providing a radial labyrinth seal 21, the inner and outer annular walls with annular ridges forming labyrinth seals, and the outer deflector 36, the seal assembly 10 of the present invention may include any one or more of such components. That is, a seal assembly 10 in accordance with the present invention may only include a radial labyrinth seal 21, only the inner and outer circumferential labyrinth seals 33, 35, just the deflector 36, etc., or any combination of two of these components (e.g., radial labyrinth seal 21 and inner circumferential seal 33, etc.)

Figure 2:
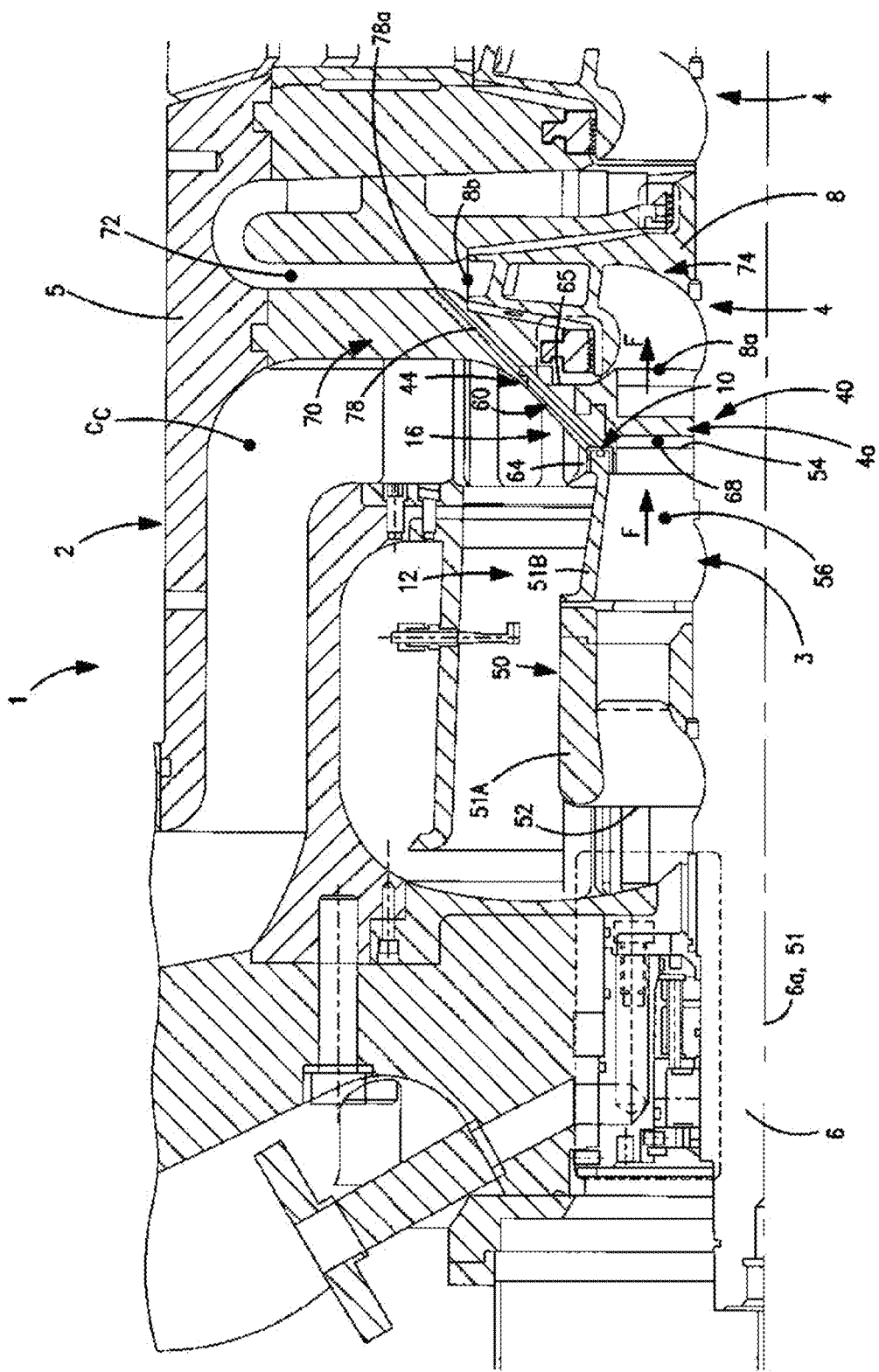
FIG. 2 is an enlarged, broken-away axial cross-sectional view of an upper half of the separator/compressor, showing a more detailed view of the separator and compressor.

Referring to FIGS. 1 and 2, the rotatable member 12 and the static member 16 form a fluid handling assembly 40 for the fluid machine 1, most preferably portions of a rotary separator 3 and an adjacent "transition" member 44 between the rotary separator 3 and a subsequent device or component (e.g., a compressor impeller, an outlet pipe, etc.). As discussed above, the fluid machine 1 is preferably a compressor 2 that includes one or more compression stages 4, each stage 4 including an impeller 8 mounted to the shaft 6 and each impeller 8 having an inlet 8a and an outlet 8b. The casing 5 has an interior chamber $C_C$ and the rotor shaft 6 extends generally centrally and longitudinally through the chamber $C_C$. However, the fluid machine 1 may alternatively be any other appropriate fluid handling device, such as for example, a "stand alone" rotary separator, etc., in which a rotatable member interfaces or seals against a static member.

Referring to FIGS. 2-5, with the preferred application described above, the rotatable member 12 is preferably at least part of a rotary separator 3 including a generally tubular body 50 mounted to the rotor shaft 6 so as to be rotatable therewith. The tubular body 50 has opposing inlet and outlet ends 52, 54, the outlet end 54 providing the axial end 14 sealing against the static member 16, and a central bore 56 extending between the two ends 52, 54. The tubular body 50 has a central axis 51, which is generally collinear with the machine central axis 6a, and inner and outer circumferential surfaces 53A, 53B, respectively, extending circumferentially about the axis 51. Most preferably, the tubular body or "drum" 50 includes two axially spaced apart, connected body sections 51A, 51B; specifically a first, generally circular cylindrical portion 51A providing the inlet end 52 and a second, generally conical section 51B providing the outlet end 54. The drum conical section 51B has an inner diameter (not indicated) that tapers from a greater value proximal to the cylindrical section 52 to a lesser value generally proximal to the outlet end 54, such that separated liquid is forced in a direction toward the inlet end 52. As best shown in FIG. 3, the drum conical section 51B further has a circumferential collection groove 55 and a plurality of liquid outlet through holes 57 extending radially outwardly from the groove 55, through which separated liquid passes for subsequent collection. Further, as indicated in FIG. 5, the body conical section 51B also includes a radially-outwardly extending, generally circular portion 58 at the outlet end 54, as discussed above, which provides substantially circular, inner and outer surface sections 58a, 58b against which seals the one or more inner and outer annular ridges 32, 34, respectively.

Figure 8:
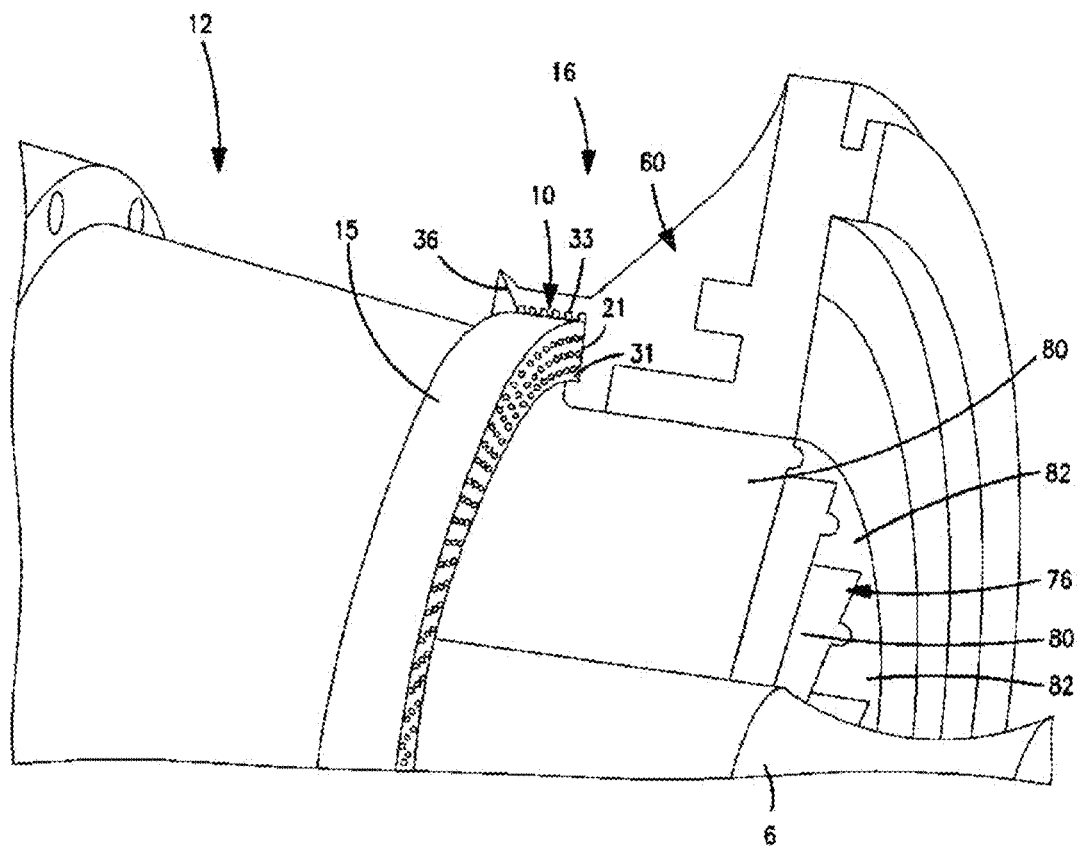
FIG. 8 is a broken-away, perspective view of portions of the separator member and the static member.

Referring to FIGS. 2-5, the static member 16 is preferably at least a portion of an impeller inlet wall 60 fixedly disposed within the casing 5, but may alternatively be a partition wall or "diaphragm" located between the separator outlet end 54 and an impeller inlet wall (structure not shown). The inlet wall 60 preferably includes a generally conical ring-like body 62 with first and second axial ends 64, 65, respectively: The first end 64 provides the static member axial end 18 as described above, and the second end 65 is connected with a diaphragm wall 70 that partially defines fluid passages 72 for the first compression stage 4 (see FIG. 2). The static inlet wall 62 includes at least one passage 66 extending inwardly from the static member axial end 18, preferably a central through hole or bore 68 extending completely through the body 62 between the body ends 64, 65. Further, the static member bore 68 is fluidly coupled with the separator bore 56 such that fluid flow F through the separator bore 56 enters the at least one static member passage 66/bore 68 for subsequent handling, preferably compression within the first compression stage 4. Further, a de-swirl vane member 76 is preferably mounted within the central static member bore 68, which functions to de-swirl and circumferentially distribute fluid flow entering the first compression stage 4, as best shown in FIGS. 3 and 8. The de-swirl vane member 76 includes a plurality of angled vanes 80 which divide the bore 68 into a plurality of separate flow passages 82 fluidly connected with the inlet 8a of the first or single impeller 8.

Referring to FIGS. 2 and 5, with the preferred compressor inlet application described above, the seal assembly 10 also preferably includes at least one and preferably a plurality of fluid passages 78 (only one shown) extending at least partially axially through the static member 16 and spaced circumferentially about the axis 6a. Each fluid passage 78 has an inlet 78a fluidly coupled with an impeller outlet and an outlet 78b extending through the static member end surface 19. As such, each fluid passage 78 is configured to direct fluid from the associated impeller 8 generally into the clearance space $S_C$. Specifically, each passage 78 is configured to direct a "purge" flow $f_P$ of compressed gas, preferably drawn from the impeller outlet 8b of the first compression stage 4, into the clearance space $S_C$. The purge flow $f_P$ from the passages 78 create a positive pressure at the interface $I_S$ between the rotatable member 12 and the static member 16, which forces liquids away from the entrance(s) to the seal area to thereby prevent "ingestion" of liquids within the seal assembly 10.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

I claim:
1. A seal assembly for a fluid machine, comprising:
   a static member fixedly disposed within a casing and including a static member axial end having an end surface; and
   a rotatable member coupled with a shaft and spaced axially from the static member, the rotatable member having an axial end with a radial end surface extending circumferentially about a shaft axis, the rotatable member radial end surface being located adjacent to and facing the static member end surface such that a clearance space is defined between the two end surfaces, the rotatable member further having a plurality of openings extending axially inwardly from the rotatable member radial end surface and spaced circumferentially about the shaft axis such that land surface sections are defined on the rotatable member radial end surface, at least one of the land surface sections and the openings being configured to prevent fluid flow radially inwardly through the clearance space, wherein
      the rotatable member includes a tubular drum having opposing inlet and outlet axial ends and a central bore extending between the two axial ends, the rotatable member radial end surface being disposed on the tubular drum outlet axial end,
      the static member has a central opening configured to fluidly connect the rotatable member tubular drum central bore with an impeller inlet, and
      the rotatable member tubular drum central bore is fluidly connected with a source of fluid and the tubular drum has an inner separation surface extending circumferentially about the shaft axis, the inner separation surface being configured to separate at least a portion of liquid in fluid contacting the inner separation surface.

2. The seal assembly as recited in claim 1, wherein the land surface sections of the rotatable member radial end surface are slidably displaced against the static end surface and configured to function as a plurality of labyrinth seal teeth or to direct fluid contacting the land surface sections radially outwardly away from the shaft axis during rotation of the rotatable member.

3. The seal assembly as recited in claim 1, wherein the rotatable member end surface is configured to direct liquid entering the clearance space radially outwardly along at least one of the land surface sections or into at least one of the plurality of openings so as to prevent liquid flow through the clearance space.

4. The seal assembly as recited in claim 1, wherein each one of the plurality of openings of the rotatable member is configured to collect liquid flowing inwardly through the clearance space.

5. The seal assembly as recited in claim 1, wherein the land surface sections of the rotatable member radial end surface include radially-extending portions, each land surface radially-extending portion being configured to direct liquid contacting the radially-extending portion radially outwardly away from the shaft axis during rotation of the rotatable member, or wherein the land surface sections include circumferential portions, each land surface circumferential portion being configured to direct fluid contacting the circumferential portion toward an adjacent land surface radial portion during rotation of the rotatable member.

6. The seal assembly as recited in claim 1 or 5, wherein each of the plurality of openings of the rotatable member are configured to collect liquid flowing radially inwardly through the opening and to subsequently direct collected liquid out of the opening and radially outwardly away from the shaft axis during rotation of the rotatable member.

7. The seal assembly as recited in claim 1, wherein each of the plurality of openings of the rotatable member is formed as a circular hole having an enclosed inner end or are arranged in a first and second circular rows of openings, the second row of openings being spaced radially outwardly from the first row of openings and each opening of the first row of openings being radially aligned with a separate one of the openings of the second row of openings.

8. The seal assembly as recited in claim 1, further comprising:
a first annular wall section extending axially from the static member axial end toward the rotatable member and having an inner circumferential wall surface; and
a second annular wall section extending axially from the static member toward the rotatable member axial end, the second annular wall being spaced radially inwardly from the first annular wall section and having an outer circumferential wall surface, and the inner and outer circumferential wall surfaces defining an annular pocket sized to receive a portion of the rotatable member axial end.

9. The seal assembly as recited in claim 8, wherein:
the outer circumferential wall surface includes at least one annular ridge extending radially inwardly toward the rotatable member axial end and circumferentially about the shaft axis; and
the inner circumferential wall surface includes at least one annular ridge extending radially outwardly toward the rotatable member axial end and circumferentially about the shaft axis.

10. The seal assembly as recited in claim 9, wherein at least the outer circumferential wall surface includes a plurality of the radially inwardly extending annular ridges.

11. The seal assembly as recited in claim 9, wherein:
the at least one annular ridge of the inner circumferential wall surface of the first annular wall section is configured to provide a labyrinth seal for at least inhibiting fluid flow between the first annular wall section and an outer circumferential surface of the rotatable member; and
the at least one annular ridge of the outer circumferential wall surface of the second annular wall section is configured to provide a labyrinth seal for at least inhibiting fluid flow between the second annular wall section and an inner circumferential surface of the rotatable member.

12. The seal assembly as recited in claim 1, wherein the static member axial end has an annular deflector portion extending axially and radially outwardly from the static member axial end and extending circumferentially about the shaft axis, the annular deflector portion being spaced radially outwardly from the static member end surface and having an angled surface facing toward the shaft axis and away from the static member end surface, the deflector angled surface being configured to deflect liquid contacting the angled surface in a direction away from the rotatable member axial end.

13. A compressor comprising:
a casing;
a shaft disposed within the casing so as to be rotatable about a central axis;
a static member fixedly disposed within the casing and including a static member axial end having an end surface;
a separator member coupled with the shaft and spaced axially from the static member and having an axial end with a radial end surface extending circumferentially about the shaft axis, the separator member end surface being located adjacent to and facing the static member end surface such that a clearance space is defined between the two end surfaces; and
at least one impeller mounted on the shaft and disposed within the casing, the at least one impeller having an inlet and an outlet, the static member being disposed adjacent the impeller inlet and having a passage with an inlet fluidly coupled with the impeller outlet and an outlet extending through the static member end surface such that the passage is configured to direct fluid from the at least one impeller into the clearance space, wherein:
the separator member has a plurality of openings extending axially inwardly from the separator member end surface and spaced circumferentially about the shaft axis such that land surface sections are defined on the separator member end surface, and the land surface sections and the openings are configured to prevent fluid flow through the clearance space; or
the static member includes at least one outer annular ridge extending from an inner circumferential surface of the static member and toward an outer circumferential surface of the separator member, and the separator member includes at least one inner annular ridge extending from an outer circumferential surface of the static member and toward an inner circumferential surface of the separator member; or
the static member has inner and outer annular wall sections each extending axially from the static member axial end and toward the separator member, the inner and outer annular wall sections defining an annular pocket configured to receive a portion of a separator outlet end; or
the static member has an annular deflector portion extending axially and radially outwardly from the static member axial end and extending circumferentially about the shaft central axis, the annular deflector portion being spaced radially outwardly from the static member end surface and having an angled surface facing toward the central axis and away from the static member end surface.

\* \* \* \* \*